(12) United States Patent
Bryson et al.

(10) Patent No.: US 10,242,499 B2
(45) Date of Patent: Mar. 26, 2019

(54) METHOD AND SYSTEM FOR GEOGRAPHIC MAP OVERLAY ONTO A LIVE FEED

(71) Applicant: International Business Machines Corporation, Armonk, NY (US)

(72) Inventors: Donald L. Bryson, Chattanooga, TN (US); Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 62 days.

(21) Appl. No.: 15/044,582

(22) Filed: Feb. 16, 2016

(65) Prior Publication Data

US 2017/0236331 A1 Aug. 17, 2017

(51) Int. Cl.
*G06T 19/00* (2011.01)
*G06T 17/05* (2011.01)

(52) U.S. Cl.
CPC ............ *G06T 19/006* (2013.01); *G06T 17/05* (2013.01)

(58) Field of Classification Search
None
See application file for complete search history.

(56) References Cited

U.S. PATENT DOCUMENTS

| | | |
|---|---|---|
| 6,445,815 B1 | 9/2002 | Sato |
| 8,405,680 B1 | 3/2013 | Cardoso Lopes et al. |
| 8,433,336 B2 | 4/2013 | Lee et al. |
| 8,681,178 B1 | 3/2014 | Tseng |
| 8,971,970 B2 | 3/2015 | Lindner |
| 2003/0210228 A1* | 11/2003 | Ebersole .............. G02B 27/017 345/157 |
| 2008/0192118 A1 | 8/2008 | Rimbold et al. |

(Continued)

FOREIGN PATENT DOCUMENTS

| | | | |
|---|---|---|---|
| CN | 202694583 U | * | 1/2013 |
| CN | 102589528 B | * | 12/2013 |
| EP | 2318488 A3 | | 1/2012 |

OTHER PUBLICATIONS

Jonoski et al, "Mobile Phone Applications in the Water Domain", Environmental Engineering and Management Journal, 11(5), pp. 919-930, May 2012.*

(Continued)

*Primary Examiner* — Kee M Tung
*Assistant Examiner* — Patrick F Valdez
(74) *Attorney, Agent, or Firm* — Cantor Colburn LLP; Tihon Poltavets

(57) ABSTRACT

A computer program product for overlaying geographic map data onto a live feed is provided. The computer program product includes a computer readable storage medium having program instructions embodied therewith. The program instructions are readable and executable by a processing circuit to cause the processing circuit to approximate fluid depth on fixed points in a live feed to calculate discrete depth readings, combine the discrete depth readings with a contour map associated with the live feed to generate a fluid depth map and combine the fluid depth map with the live feed to produce an augmented reality image including the fluid depth map superimposed onto the live feed.

11 Claims, 4 Drawing Sheets

(56) References Cited

U.S. PATENT DOCUMENTS

| | | | | |
|---|---|---|---|---|
| 2008/0278311 A1* | 11/2008 | Grange | ............ | G01C 21/36 |
| | | | | 340/539.2 |
| 2010/0238161 A1* | 9/2010 | Varga | ............ | G06T 17/05 |
| | | | | 345/419 |
| 2011/0029243 A1* | 2/2011 | Gallagher | ............ | G01W 1/00 |
| | | | | 702/3 |
| 2014/0135040 A1* | 5/2014 | Edge | ............ | H04W 4/025 |
| | | | | 455/456.6 |
| 2014/0267723 A1* | 9/2014 | Davidson, Jr. | ............ | H04N 7/183 |
| | | | | 348/147 |
| 2016/0307373 A1* | 10/2016 | Dean | ............ | G06T 19/006 |
| 2017/0039765 A1* | 2/2017 | Zhou | ............ | G06T 19/006 |

OTHER PUBLICATIONS

Wursthorn et al, "Applications for Mixed Reality", XXth ISPRS Congress, Istanbul, Turkey, 2004.*

Holger Glockner et al., "Augmented reality in logistics : Changing the way we see logistics—a DHL perspective", DHL customer Solutions & Innovation, 2014, 28 pages.

How augmented reality helps doctors save lives; Retrieved on May 16, 2016; Retrieved from http://readwrite.com/2010/06/02/how_augmented_reality_helps_doctors_save_lives.

* cited by examiner

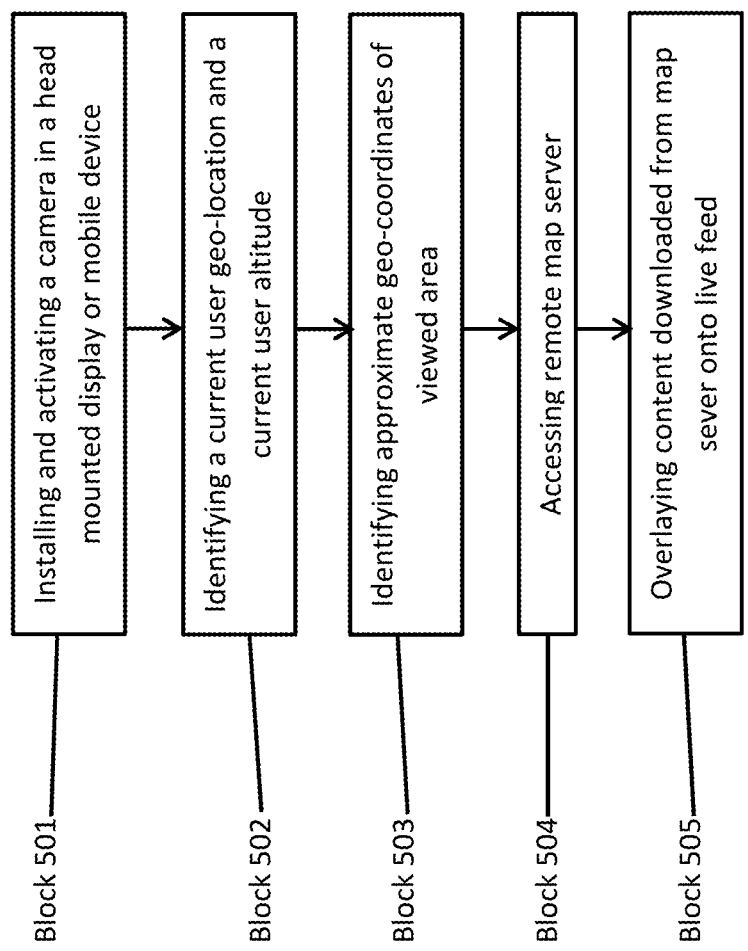

METHOD AND SYSTEM FOR GEOGRAPHIC MAP OVERLAY ONTO A LIVE FEED

BACKGROUND

The present invention relates to a geographic map overlay and, more specifically, to a method and system for overlaying map data onto real world data.

Augmented reality (AR) is a live direct or indirect view of a physical, real-world environment whose elements are augmented (or supplemented) by computer-generated sensory input such as sound, video, graphics or global positioning system (GPS) data. It is related to a more general concept called mediated reality, in which a view of reality is modified (possibly even diminished rather than augmented) by a computer. As a result, the technology functions by enhancing one's current perception of reality (whereas virtual reality, by contrast, replaces the real world with a simulated one). Augmentation is conventionally done in real-time and in semantic context with environmental elements, such as sports scores on television during a match.

With the help of advanced AR technology, made available by smart glasses, for example, which are capable of computerized vision and object recognition, information about the surrounding real world of the user can be made interactive and able to be digitally manipulated. In some cases, artificial information about the environment and its objects can be overlaid on the real world as seen through smart glasses.

Meanwhile, during flood or heavy snow conditions, an entire geographic surface area may be covered with water or snow. In these or other cases, people may have a difficult time distinguishing among road areas, land areas, water bodies, etc., and severe accidents may result.

SUMMARY

According to an embodiment of the present invention, a computer program product for overlaying geographic map data onto a live feed is provided. The computer program product includes a computer readable storage medium having program instructions embodied therewith. The program instructions are readable and executable by a processing circuit to cause the processing circuit to approximate fluid depth on fixed points in a live feed to calculate discrete depth readings, combine the discrete depth readings with a contour map associated with the live feed to generate a fluid depth map and combine the fluid depth map with the live feed to produce an augmented reality image including the fluid depth map superimposed onto the live feed.

According to another embodiment of the present invention, a computing system for overlaying geographic map data onto a live feed is provided. The computing system includes a computer readable storage medium having instructions stored thereon that are executable by a processing circuit to cause the processing circuit to approximate fluid depth on fixed points in a live feed to calculate discrete depth readings, combine the discrete depth readings with a contour map associated with the live feed to generate a fluid depth map and combine the fluid depth map with the live feed to produce an augmented reality image including the fluid depth map superimposed onto the live feed.

According to yet another embodiment of the present invention, a computer-implemented method for overlaying geographic map data onto a live feed is provided. The computer-implemented method includes approximating fluid depth on fixed points in a live feed to calculate discrete depth readings, combining the discrete depth readings with a contour map associated with the live feed to generate a fluid depth map and combining the fluid depth map with the live feed to produce an augmented reality image including the fluid depth map superimposed onto the live feed.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 5 is a flow diagram illustrating a computer-implemented method of overlaying geographic data onto a live feed.

DETAILED DESCRIPTION

As will be described below, a method and system are provided by which users are able to understand a layout of an area in a live feed even though the area is covered with fluid, such as snow or flood water, in order to help users navigate freely or perform rescue work.

Figure 1:
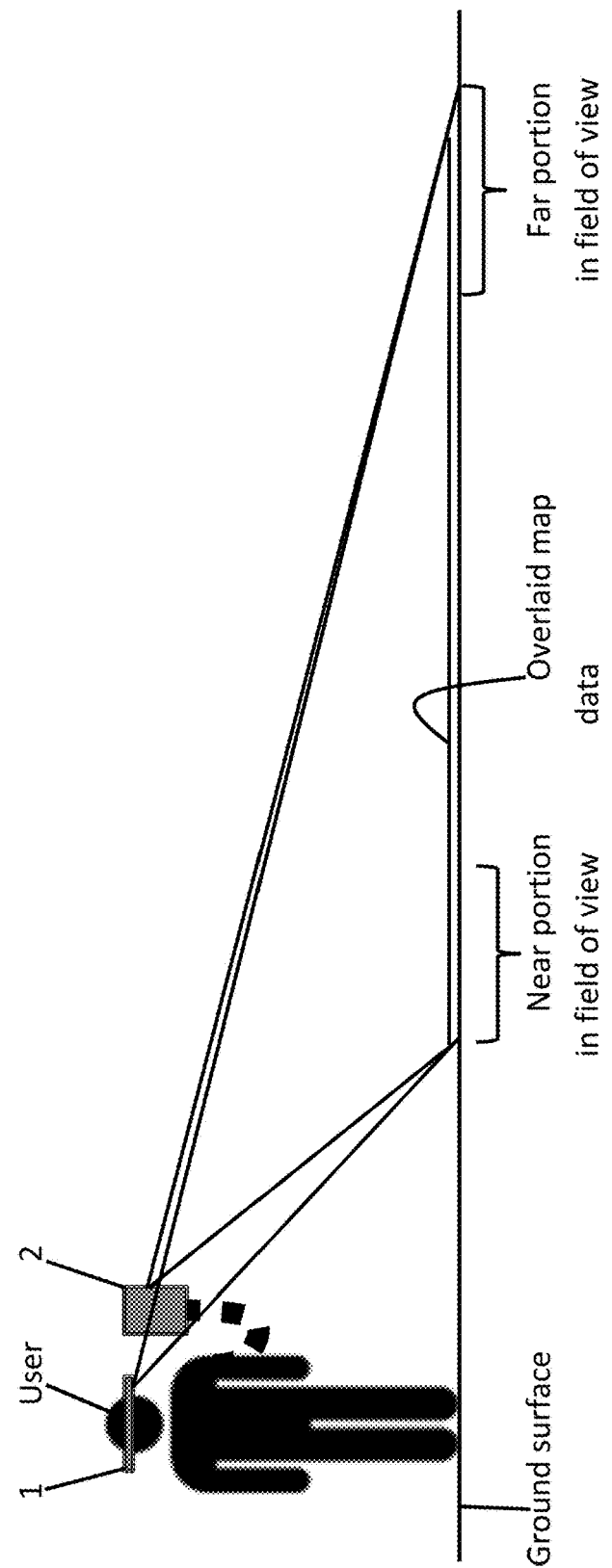
FIG. 1 is a side schematic view of a user and a field of view of the user through smart glasses or a handheld computing device.

With reference to FIG. 1, a user is illustrated standing on the ground with either or both of smart glasses 1 or a handheld computing device 2, which may be provided as a smartphone or a tablet. In any case, the user may look into the display unit of the smart glasses 1 or the handheld computing device 2 to see a display of a real world ground surface lying within his field of view. As will be described below, this display will be augmented with geographic data derived from a torrent map, a satellite map, a line diagram and/or a three-dimensional map and, where the real world ground surface is covered with fluid (e.g., snow, water or mud), fluid depth data.

Figure 2:
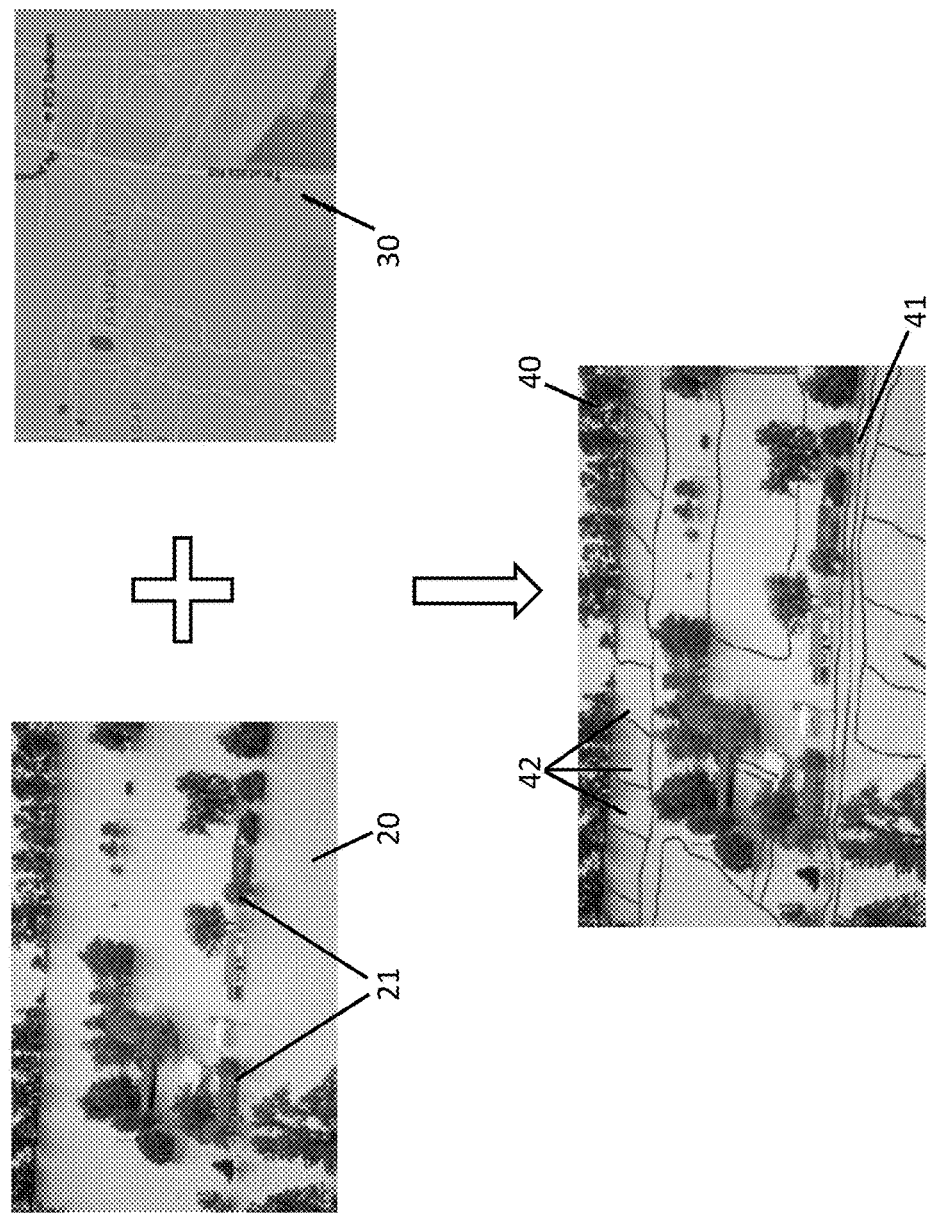
FIG. 2 is a flow diagram illustrating an overlay of map data onto real world data.

With reference to FIG. 2, a flooded area 20 is shown as an image that could be seen by the user through the smart glasses 1 or the handheld computing device 2 from an elevated point of view. While the flooded area is covered by flood waters, it will be understood that these could be replaced by heavy snow accumulations or by mud flows. In any case, the image includes fixed points 21 in various locations that protrude above the water line. These fixed points 21 may be defined along tree trunks or building walls and provide for a way to measure the depth of the water locally.

Still referring to FIG. 2, geographic map 30 is provided and may be stored in the memory of the smart glasses 1 or the handheld computing device 2 or may be accessible by a networking unit of the smart glasses 1 or the handheld computing device 2. In any case, the geographic map 30 may include representations of political borders, property borders, and roads in the vicinity of the items seen in the image of the flooded area 20. The geographic map may further include topographical data to illustrate a lay of the land in and around the flooded area 20. As such, the image of the flooded area 20 can be overlaid by representations of elements shown in the geographic map 30. For example, as shown in the combined image 40, roads 41 and property lines 42 are superimposed over the image of the flooded area 20.

Figure 3:
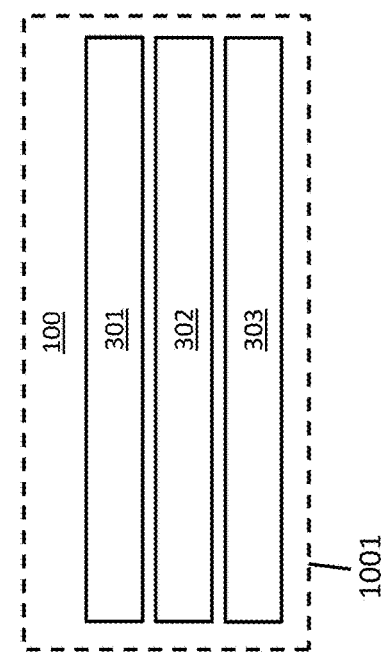
FIG. 3 is a schematic illustration of a computer program product in accordance with embodiments.

With this in mind and, with reference to FIG. 3, a computer program product 100 may be stored in a computer readable medium 1001 of or accessible by the smart glasses 1 or the handheld computing device 2. The computer program product 100 may be configured for overlaying geographic map data onto a live feed and has first-third program instructions 301, 302 and 303. The first-third program instructions are readable and executable by a processing circuit of the smart glasses 1 or the handheld computing device 2 to cause the processing circuit to approximate fluid (e.g., water, snow or mud) depth on fixed points in a live feed to calculate discrete depth readings, to combine the discrete depth readings with a contour map, such as the geographic map 30 described above, which is associated with the live feed to generate a fluid depth map at places that are remote from the fixed points, to combine the fluid depth map with the live feed to produce an augmented reality image including the fluid depth map superimposed onto the live feed.

In accordance with embodiments, the first program instructions 301 cause the processing circuit to approximate the fluid depth by referring to historical data associated with the fixed points 21 in the live feed (which in the embodiment illustrated by FIG. 2 is a live feed of the flooded area 20 as projected through the smart glasses 1 or the handheld computing device 2). The historical data in this case is data reflective of a height from a ground surface of various heights defined along the fixed points 21 so that the visible portions of the fixed points 21 provide an effective measurement of the local depth of the water.

In accordance with further embodiments, the contour map may be derived from the geographic map 30 or, more particularly, one or more of a torrent map, a satellite map, a line map and a three-dimensional map. Especially in the case of the three-dimensional or topographic map, if it is assumed that the water level in the image of the flooded area 20 is generally uniform, the known topography in and around the flooded area 20 will allow for a depth calculation at areas of the image of the flooded area 20 that are remote from the fixed points 21. Even if the water level is not uniform, as in the case of a flow of water down a hill, the topography of the hill and the use of fixed points 21 along the hill would allow for a depth calculation along the hilly areas as well.

Figure 4:
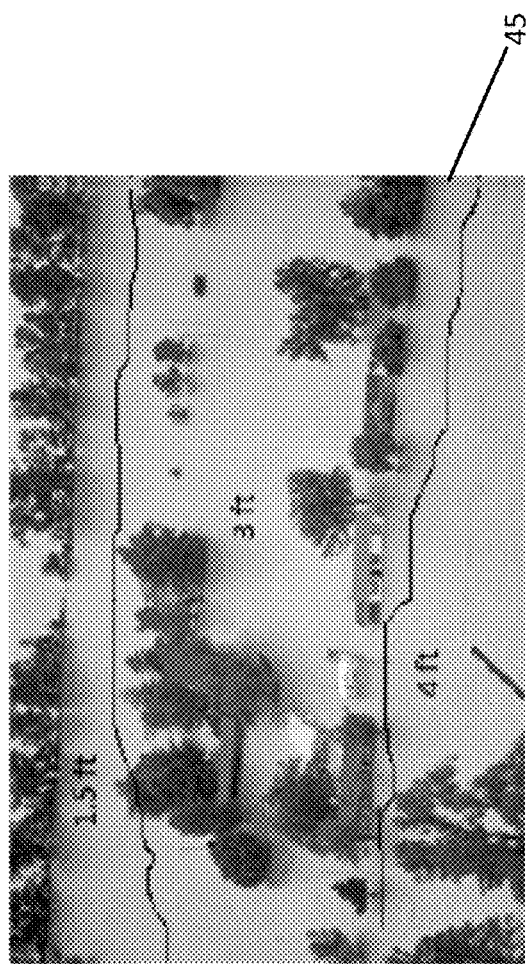
FIG. 4 is an illustration of fluid depth data generated by the computer program product of FIG. 3.

In accordance with still further embodiments and, with reference to FIG. 4, once the fluid depths are calculated, a fluid depth map 45 may be generated to illustrate the fluid depth at the fixed points 21 and at locations that are remote from the fixed points. Such fluid depth map 45 may use textual representations of fluid depth, numerical representations of fluid depth or color/textured representations of fluid depth at the fixed points 21 and at the locations that are remote from the fixed points 21. In any case, the fluid depth map 45 may be combined with the live feed by overlaying the fluid depth map 45 onto the image of the flooded area 20, as shown in FIG. 4, or onto the combined image 40 of FIG. 2. Here, it is to be understood that the combination of the fluid depth map 45 with the live feed is accomplished by adjusting for a user perspective (see FIG. 1) so that foreground portions of both the fluid depth map 45 and the live feed of the resulting image are larger than corresponding background portions.

With reference to FIG. 5, a partially computer-implemented method of overlaying geographic map data onto a live feed is provided. As shown in FIG. 5, the partially computer-implemented method includes installing and activating a camera in a head mounted display or mobile device (e.g., the smart glasses 1 or the handheld computing device 2) to thereby identify a field of view at block 501. Subsequently, at block 502, a geo-coordinate sensor of the head mounted display or the mobile device will identify a current user geo-location and a current user altitude. Based on the identified field of view calculation and the identified user geo-location/altitude, approximate geo-coordinates of an area the user is viewing will be calculated and identified at block 503 and a remote map server will be accessed at block 504. Then, with map data downloaded from the map server, the downloaded map data will be transparently overlaid over the viewed content at block 505 with adjustments made based on the viewing perspective of the user. The overlaid map data will be configured to be interacted with by the user and may include annotations providing the fluid depth information described above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for overlaying geographic map data onto a live feed of a flooded environment, which is flooded by at least one of water, snow and mud, the computer program product comprising a computer readable storage medium having program instructions embodied therewith, the program instructions being readable and executable by a processing circuit to cause the processing circuit to:

project the live feed of the flooded environment through smart glasses or a handheld computing device worn or held by a user;

determine a location of the smart glasses or the handheld computing device and the live feed;

obtain a contour map associated with the live feed of the determined location from a remote server;

derive a topology of the determined location from the contour map such that approximate fluid depths on fixed points in the live feed can be generated from a comparison between the topology and fluid levels at the determined location to thereby calculate discrete fluid level depth readings at the fixed points;

combine the discrete fluid level depth readings with the contour map associated with the live feed to generate a fluid depth map;

combine the fluid depth map with the live feed to enable production of an augmented reality image which includes the fluid depth map superimposed onto the live feed, which is user interactive and which is adjusted for a perspective of the user so that foreground portions of the augmented reality image are larger than corresponding background portions;

produce the augmented reality image which includes the fluid depth map superimposed onto the live feed, which is user interactive and which is adjusted for the perspective of the user; and project the augmented reality image adjusted for the perspective of the user and including the fluid depth map superimposed onto the live feed through the smart glasses or the handheld computing device for interaction with a user.

2. The computer program product according to claim 1, wherein the program instructions cause the processing circuit to approximate the fluid depth by reference to historical data associated with the fixed points in the live feed.

3. The computer program product according to claim 1, wherein the contour map is derived from one or more of a torrent map, a satellite map, a line map and a three-dimensional map.

4. The computer program product according to claim 1, wherein the fluid depth map illustrates fluid depth in one or more of varying colors, textual information and numerical information.

5. A computing system for overlaying geographic map data onto a live feed of a flooded environment, which is flooded by at least one of water, snow and mud, the computing system comprising a computer readable storage medium having instructions stored thereon that are executable by a processing circuit to cause the processing circuit to:

project the live feed of the flooded environment through smart glasses or a handheld computing device worn or held by a user;

determine a location of the smart glasses or the handheld computing device and the live feed;

obtain a contour map associated with the live feed of the determined location from a remote server;

derive a topology of the determined location from the contour map such that approximate fluid depths on fixed points in the live feed can be generated from a comparison between the topology and fluid levels at the determined location to thereby calculate discrete fluid level depth readings at the fixed points;

combine the discrete fluid level depth readings with the contour map associated with the live feed to generate a fluid depth map;

combine the fluid depth map with the live feed to enable production of an augmented reality image which includes the fluid depth map superimposed onto the live feed, which is user interactive and which is adjusted for a perspective of the user so that foreground portions of the augmented reality image are larger than corresponding background portions;

produce the augmented reality image which includes the fluid depth map superimposed onto the live feed, which is user interactive and which is adjusted for the perspective of the user; and project the augmented reality image adjusted for the perspective of the user and including the fluid depth map superimposed onto the live feed through the smart glasses or the handheld computing device for interaction with a user.

6. The computing system according to claim 5, wherein the instructions cause the processing circuit to approximate the fluid depth by reference to historical data associated with the fixed points in the live feed.

7. The computing system according to claim 5, wherein the contour map is derived from one or more of a torrent map, a satellite map, a line map and a three-dimensional map.

8. The computing system according to claim 5, wherein the fluid depth map illustrates fluid depth in one or more of varying colors, textual information and numerical information.

9. A computer-implemented method for overlaying geographic map data onto a live feed of an environment, which is flooded by at least one of water, snow and mud, comprising:

projecting the live feed of the flooded environment through smart glasses or a handheld computing device worn or held by a user;

determining a location of the smart glasses or the handheld computing device and the live feed;

obtaining a contour map associated with the live feed of the determined location from a remote server;

deriving a topology of the determined location from the contour map such that approximate fluid depths on fixed points in the live feed can be generated from a comparison between the topology and fluid levels at the determined location to thereby calculate discrete fluid depth readings at the fixed points;

combining the discrete fluid level depth readings with a contour map associated with the live feed to generate a fluid depth map;

combining the fluid depth map with the live feed to enable production of an augmented reality image which includes the fluid depth map superimposed onto the live feed, which is user interactive and which is adjusted for a perspective of the user so that foreground portions of the augmented reality image are larger than corresponding background portions;

producing the augmented reality image which includes the fluid depth map superimposed onto the live feed, which is user interactive and which is adjusted for the perspective of the user; and projecting the augmented reality image adjusted for the perspective of the user and including the fluid depth map superimposed onto the live feed through the smart glasses or the handheld computing device for interaction with a user.

10. The computer-implemented method according to claim 9, wherein the approximating comprises approximating the fluid depth by reference to historical data associated with the fixed points in the live feed.

11. The computer-implemented method according to claim 9, wherein:

the contour map is derived from one or more of a torrent map, a satellite map, a line map and a three-dimensional map, and the fluid depth map illustrates fluid depth in one or more of varying colors, textual information and numerical information.

\* \* \* \* \*